United States Patent
Takagi et al.

(10) Patent No.: US 8,233,868 B2
(45) Date of Patent: Jul. 31, 2012

(54) RADIO RECEIVER DEVICE

(75) Inventors: Kenichi Takagi, Nagoya (JP);
Katsuhiko Mutoh, Toyota (JP)

(73) Assignee: DENSO CORPORATION, Kariya (JP)

(*) Notice: Subject to any disclaimer, the term of this patent is extended or adjusted under 35 U.S.C. 154(b) by 670 days.

(21) Appl. No.: 12/222,542

(22) Filed: Aug. 12, 2008

(65) Prior Publication Data

US 2009/0054024 A1 Feb. 26, 2009

(30) Foreign Application Priority Data

Aug. 22, 2007 (JP) ................................ 2007-216156

(51) Int. Cl.
*H04B 7/00* (2006.01)
(52) U.S. Cl. ............... 455/226.3; 455/296; 455/311; 455/456; 455/230; 455/557; 370/320; 370/335; 370/342; 370/441; 370/475
(58) Field of Classification Search ............ 455/226.3, 455/456.1, 456.6, 3.01, 12.1, 13.2, 440, 233.1, 455/296, 310, 311, 230, 557, 312; 375/343, 375/354, 371, 346; 370/320, 335, 342, 441, 370/475
See application file for complete search history.

(56) References Cited

U.S. PATENT DOCUMENTS

| | | | |
|---|---|---|---|
| 5,875,449 A | | 2/1999 | Ono |
| 6,018,651 A * | | 1/2000 | Bruckert et al. ............ 455/277.1 |
| 6,263,449 B1 | | 7/2001 | Motohashi |
| 6,952,573 B2 * | | 10/2005 | Schucker et al. ............ 455/333 |
| 2004/0136439 A1* | | 7/2004 | Dewberry et al. ............ 375/130 |
| 2005/0036559 A1* | | 2/2005 | Lamy et al. ............ 375/253 |
| 2007/0298748 A1* | | 12/2007 | Banh et al. ............ 455/296 |

FOREIGN PATENT DOCUMENTS

| | | |
|---|---|---|
| JP | 05-291974 | * 5/1993 |
| JP | 05291974 | * 5/1993 |
| JP | A-05-291974 | 11/1993 |
| JP | A-08-255117 | 10/1996 |
| JP | A-2001-159673 | 12/2001 |
| JP | A-2003-139839 | 5/2003 |

OTHER PUBLICATIONS

Office Action dated May 28, 2010 issued from the Korean Intellectual Property Office in the corresponding Korean patent application No. 10-2008-0080053 (with English translation).

(Continued)

*Primary Examiner* — Temesgh Ghebretinsae
*Assistant Examiner* — MD Talukder
(74) *Attorney, Agent, or Firm* — Posz Law Group, PLC

(57) ABSTRACT

A radio receiver device includes a radio signal processing section and a digital processing section. The radio signal processing section converts a received radio signal into a digital signal, demodulates the digital signal and detects a S/N ratio of the radio signal. The digital processing section digitally processes digital signals and switches over its operation mode based on the detected S/N ratio, thereby controlling a digital noise generated in the digital processing. The radio processing section checks whether the S/N ratio is lowered by a digital noise of the digital processing section or a shielding body external to the radio receiver device. The digital processing section switches over its operation mode to reduce the digital noise only when the cause of the fall of the S/N ratio is caused by the digital noise.

5 Claims, 7 Drawing Sheets

OTHER PUBLICATIONS

Notice of Allowance dated Nov. 26, 2010 issued in corresponding Korean patent application No. 10-2008-0080053 (with English translation).

Office Action mailed Sep. 1, 2009 in corresponding Japanese patent application No. 2007-216156 (and English translation).

Office Action mailed on Mar. 9, 2011 issued in the corresponding Chinese Patent Application No. 200810145995.5 (English translation enclosed).

* cited by examiner

RADIO RECEIVER DEVICE

CROSS REFERENCE TO RELATED APPLICATION

This application is based on and incorporates herein by reference Japanese Patent Application No. 2007-216156 filed on Aug. 22, 2007.

FIELD OF THE INVENTION

The present invention relates to a radio receiver device that digitally processes a received radio signal.

BACKGROUND OF THE INVENTION

A conventional radio receiver device digitally processes a received radio signal of radio frequency by converting the received radio signal into a corresponding digital signal and demodulating the same.

In a radio receiver device disclosed in U.S. Pat. No. 6,952,573 (JP 2007-506363A), an analog circuit section for processing radio signals of radio frequencies and a digital circuit section for processing digital signals are provided closely to each other. In such a configuration, digital noise generated in the digital circuit section is transmitted to the analog circuit section. As a result, its receiver sensitivity (sensitivity of receiving radio signals) and hence the signal-to-noise (S/N) ratio are lowered.

In a radio receiver device disclosed in JP 2001-159673, a GPS satellite signal of intermediate frequency is generated from a received GPS satellite signal of radio frequency, and GPS data is acquired by demodulating the GPS satellite signal. During the GPS signal generation and the GPS data acquisition are under progress, digital calculation of GPS data by a digital calculation section is stopped. As a result, generation of noise from the digital calculation section is reduced so that the sensitivity of receiving the GPS signal is not so much reduced by the digital noise.

Even if the above digital calculation is performed, the digital calculation section may not generate noise or may generate only a limited amount of noise. In this instance, the sensitivity of receiving the GPS satellite signal will not be lowered so much. Therefore, if the digital calculation processing by the digital calculation section is stopped in such an instance, the amount of digital calculation processing of the digital calculation section will be necessarily reduced, resulting in lowered processing efficiency.

SUMMARY OF THE INVENTION

It is therefore an object of the present invention to provide a radio receiver device that can continue to perform digital calculation processing without lowering a S/N ratio of a received radio signal.

According to one aspect of the present invention, a radio receiver device includes a radio signal processing section, a S/N ratio detecting section and a digital processing section. The radio signal processing section is configured to convert a received radio signal into a corresponding digital signal and demodulate the digital signal. The S/N ratio detecting section is configured to detect a S/N ratio of the radio signal. The digital processing section is configured to digitally process digital signals including at least the radio signal converted digitally and switch over its operation mode of digital processing thereof based on the detected S/N ratio, thereby controlling a digital noise which influences on the S/N ratio.

BRIEF DESCRIPTION OF THE DRAWINGS

The above and other objects, features and advantages of the present invention will become apparent from the following detailed description made with reference to the accompanying drawings. In the drawings.

DETAILED DESCRIPTION OF THE PREFERRED EMBODIMENT

Figure 1:
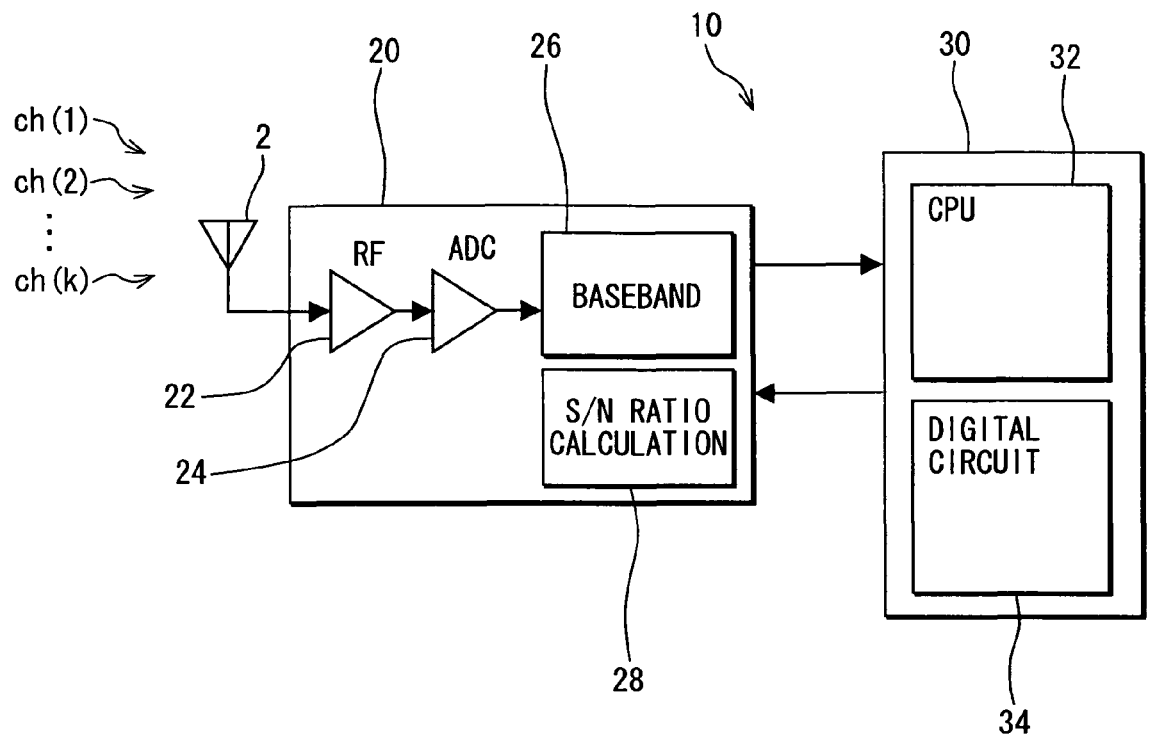
FIG. 1 is a block diagram showing a radio receiver device according to an exemplary embodiment of the present invention.

Referring first to FIG. 1, a radio receiver device 10 is provided as a receiver device for a global positioning system (GPS). The radio receiver device 10 includes an antenna 2, a radio signal processing section 20 and a digital processing section 30. The processing sections 20 and 30 are integrated in a large-scale integrated circuit.

The radio signal processing section 20 is connected to the antenna 2 and configured to receive GPS signals as radio signals of radio frequencies, which GPS satellites transmit through a plurality of channels ch(1) to ch(k). The radio signal processing section 20 is further configured to A/D-convert the received GPS signals into corresponding digital signals and demodulate the digital signals to acquire GPS data. The digital processing section 30 is configured to digitally process digital signals including the GPS data to calculate the present position of the radio receiver device 10. The digital processing section 30 is also configured to digitally process digital signals other than the GPS data.

The radio signal processing section 20 includes a radio frequency (RF) circuit 20, an analog-to-digital converter (ADC) 24, a baseband circuit 26, a signal-to-noise (S/N) ratio calculation circuit 28, a ROM, a RAM and a non-volatile memory such as a flash memory. These circuits 22, 24 and 26 are configured to process the received GPS signals. The S/N ratio calculation circuit 28 is configured to not only calculate or detect a S/N ratio, check the S/N ratio and check a cause of low S/N ratio.

Figure 2:
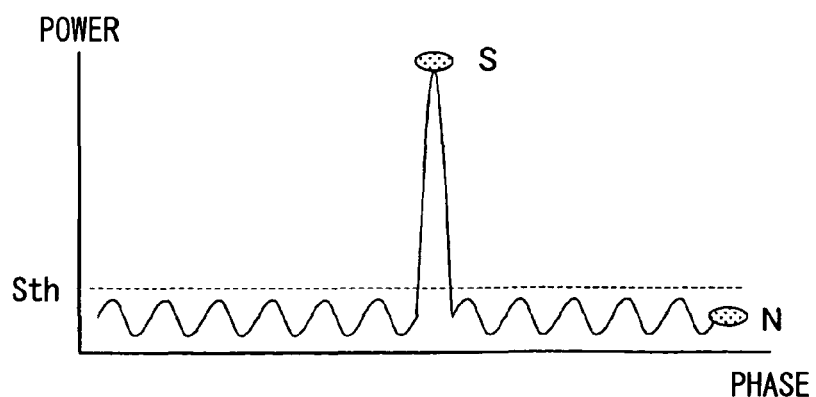
FIG. 2 is a signal diagram showing demodulated GPS data.

Specifically, the RF circuit 22 receives the GPS signals through the antenna 2 and mixes the received GPS signals with a local oscillation signal to generate GPS signals of an intermediate frequency. The ADC 24 converts the GPS signals of the intermediate frequency into the corresponding digital signals, and applies the digital signals to the baseband circuit 26. The baseband circuit 26 despreads the A/D-converted GPS signals by pseudo-noise codes, to produce the GPS data shown in FIG. 2 as the baseband in the conventional manner. In FIG. 2, "S" indicates a peak of power of the demodulated GPS data, and "N" indicates a noise included in the demodulated GPS data. The pseudo-noise codes are specific to the GPS satellites, respectively.

Figure 3:
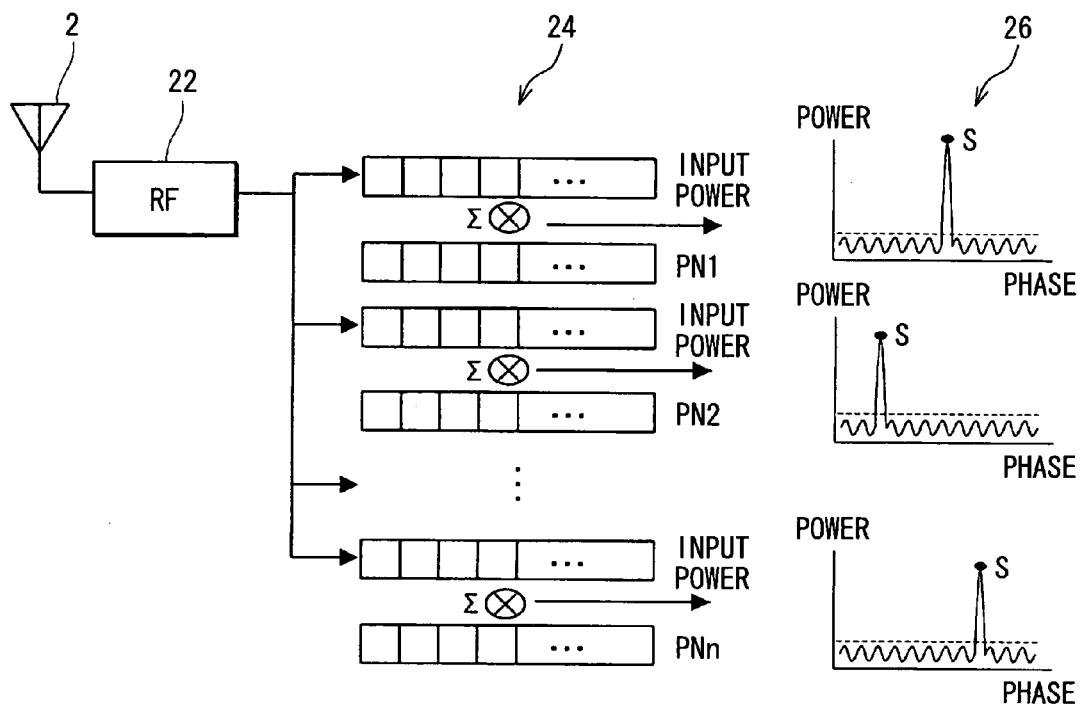
FIG. 3 is a diagram showing a process of demodulation of a GPS signal.

As shown in FIG. 3, the baseband circuit 26 is configured to include a conventional correlator and perform integration by shifting the pseudo-noise signal chip by chip relative to the GPS signals, which are received from a plurality (n) of GPS satellites (n-satellites) and A/D-converted, and measure the correlation between the GPS signals and the pseudo-noise code. Thus, the baseband circuit 26, by its correlator, demodulates the GPS signals by the pseudo-noise code and acquires the GPS data by phasing in the GPS signals and the pseudo-noise code.

The S/N ratio calculation circuit 28 is configured to calculate a S/N ratio of the GPS data acquired from the GPS signal of each GPS satellite by the baseband circuit 26, and check whether the S/N ratio is lowered by a digital noise. The S/N ratio calculation circuit 28 performs this calculation and check processing at every fixed interval, e.g. 1 millisecond (ms) based on a control program stored in a memory such as the ROM or the flash memory provided in the radio signal processing section 20.

The S/N ratio is lowered, if the power of high correlation part of demodulated signals indicated by S in FIG. 2 is lowered by the digital noise or the like. The S/N ratio calculation circuit 28 is therefore configured to check whether the level indicated by S in FIG. 2 is lower than a threshold level Sth, that is, whether the S/N ratio is lower than a predetermined threshold level SNth. The calculation circuit 28 is also configured to produce a S/N ratio check result to the digital processing section 30. The S/N ratio check result may be indicated by a noise flag, which is set (ON or 1) or reset (OFF or 0).

The digital processing section 30 includes a central processing unit (CPU) 32, a digital circuit 34, a ROM, a RAM and a nonvolatile memory such as a flash memory.

The CPU 32 is configured to perform software processing on digital signals based on a control program stored in the memory such as the ROM, the flash memory or the like, and also control the digital circuit 34, which performs hardware processing on digital signals. The software processing and the digital processing on digital signals by the CPU 32 and the digital circuit 34 are collectively referred to as digital processing. The CPU 32 and the digital circuit 34 are configured to also perform other digital processing than the digital processing of the GPS data.

The digital processing section 30 is configured to control the digital noise generated therein by switching over its operation mode based on the S/N ratio of the GPS signals (GPS data). Specifically, the CPU 30 is programmed to perform the processing shown in FIGS. 5, 7 and 9.

In this exemplary embodiment, the S/N ratio is considered to be lowered by two causes. One cause is an internal cause that is the digital noise, which is generated in the digital processing section 30 and passed to the radio signal processing section 20. The other cause is an external cause that is an electromagnetic shielding body such as a tunnel, which covers and shields the antenna 2 and the radio receiver device 10 and lowers the receiver sensitivity.

The cause of fall of the S/N ratio is determined differently. One method (1) is based on the S/N ratios of the GPS signals transmitted from the GPS satellites through respective channels. The other method (2) is based on the S/N ratios of the GPS signal transmitted from one (same) GPS satellite.

(1) S/N Ratios of a Plurality of GPS Signals

The S/N ratio is considered to fall in the following manner in respect of each cause, the is, digital noise and shielding body. Here, it is assumed that the GPS signals received through a plurality (n) of channels (n-channels) are indicated as ch(k), where "k" varies from 1 to n.

Figure 4A:
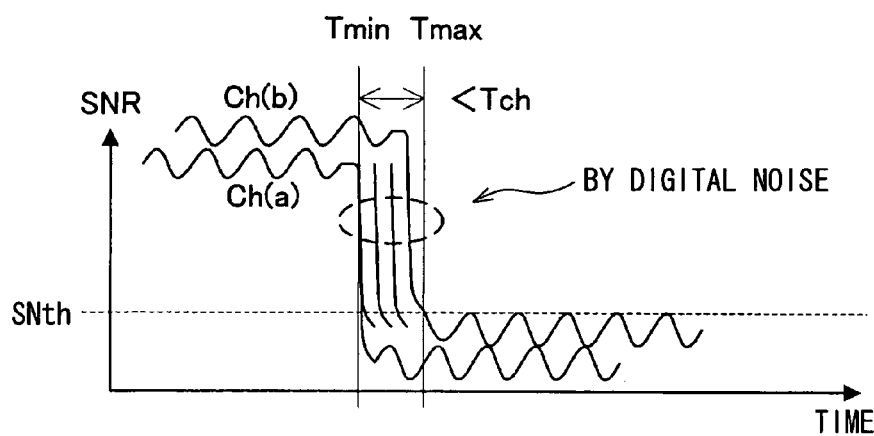
FIG. 4A and FIG. 4B are signal diagrams showing signal reception conditions of radio signals received through a plurality of channels.

In a case that the S/N ratio falls to be less than the predetermined threshold level SNth by the digital noise, all the S/N ratios of the GPS signals transmitted through the n-channels ch(k) fall at substantially the same time with respect to the same frequency, which is about the frequency of the digital noise or the harmonics of the digital noise. Specifically, as shown in FIG. 4A, the S/N ratios fall within a predetermined short period Tch. That is, the difference between the first time Tmin of the fall of the S/N ratio of a first falling channel ch(a) to the last time Tmax of the fall of the S/N ratio of a last falling channel ch(b) is less than Tch. "a" and "b" vary from 1 to n, and are different from each other. Since the S/N ratio is calculated by the calculation circuit 28 at about every 1 ms, the predetermined period Tch may be set to several milliseconds (ms) in correspondence to the number (n) of satellites and channels.

Figure 4B:
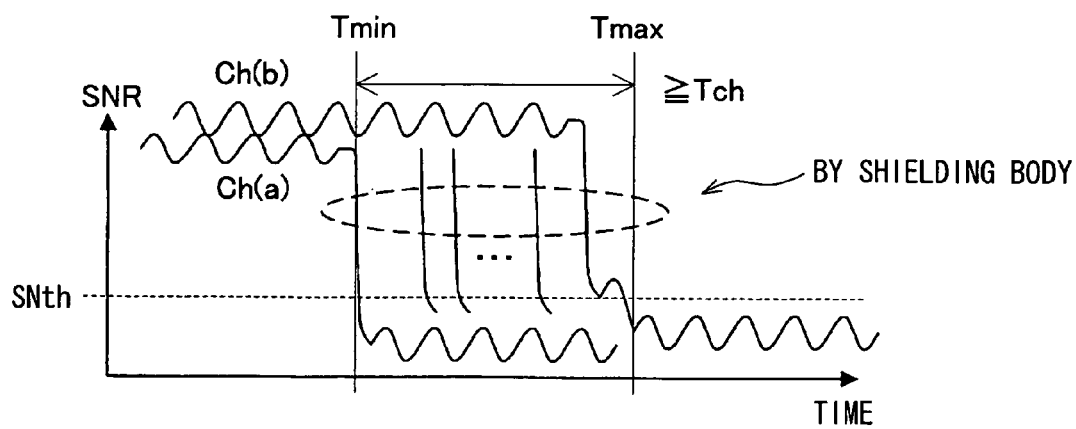

In a case that the S/N ratio falls to be less than the predetermined threshold level SNth by the shielding body, the S/N ratios of the n-channels fall at different time points over a long period, which is equal to or more than the predetermined period Tch as shown in FIG. 4B. This is because the GPS satellites are located at different positions in different distance from the radio receiver device 10 and hence the GPS signals of the different satellites are shielded by the shielding body at different time points while the radio receiver device 10 is moving in the shielding object.

For the above reasons, the S/N ratio calculation circuit 28 is configured to check whether the fall of S/N ratio is caused by the digital noise or the shielding body, by checking the period in which the S/N ratios of the GPS signals of the same frequency received through the n-channels fall. The S/N ratio calculation circuit 28 is configured to set and output the noise flag (ON or 1) to the digital processing section 30 by turning on the noise flag, when it is determined that the S/N ratios have been lowered by the digital noise of the digital processing section 30.

The CPU 32 in the digital processing section 30 is programmed to decrease the frequency of the operating clock of the digital processing section 30 or stop digital processing of low priority. By this switching-over of the operation mode, the amount or load of digital processing is reduced. As a result, generation of digital noise is reduced, and hence fall of the S/N ratio of the GPS signal is minimized.

The CPU 32 is further programmed to determine that the fall of the S/N ratio is not caused by the digital noise, when the noise flag is reset (OFF or 0). The digital processing section 30 is configured to perform the digital processing without decreasing the frequency of the operating clock, even when the radio signal processing section 20 is in operation.

It is to be noted that the frequency of the operating clock may alternatively be increased to reduce the digital noise generated in the digital processing section 30. In a case of increasing or decreasing the frequency of the operating clock to reduce the digital noise, the CPU 32 may set the frequency of the operating clock to frequencies different from the higher harmonics or lower harmonics of the GPS signals received by the radio signal processing section 20.

Figure 5:
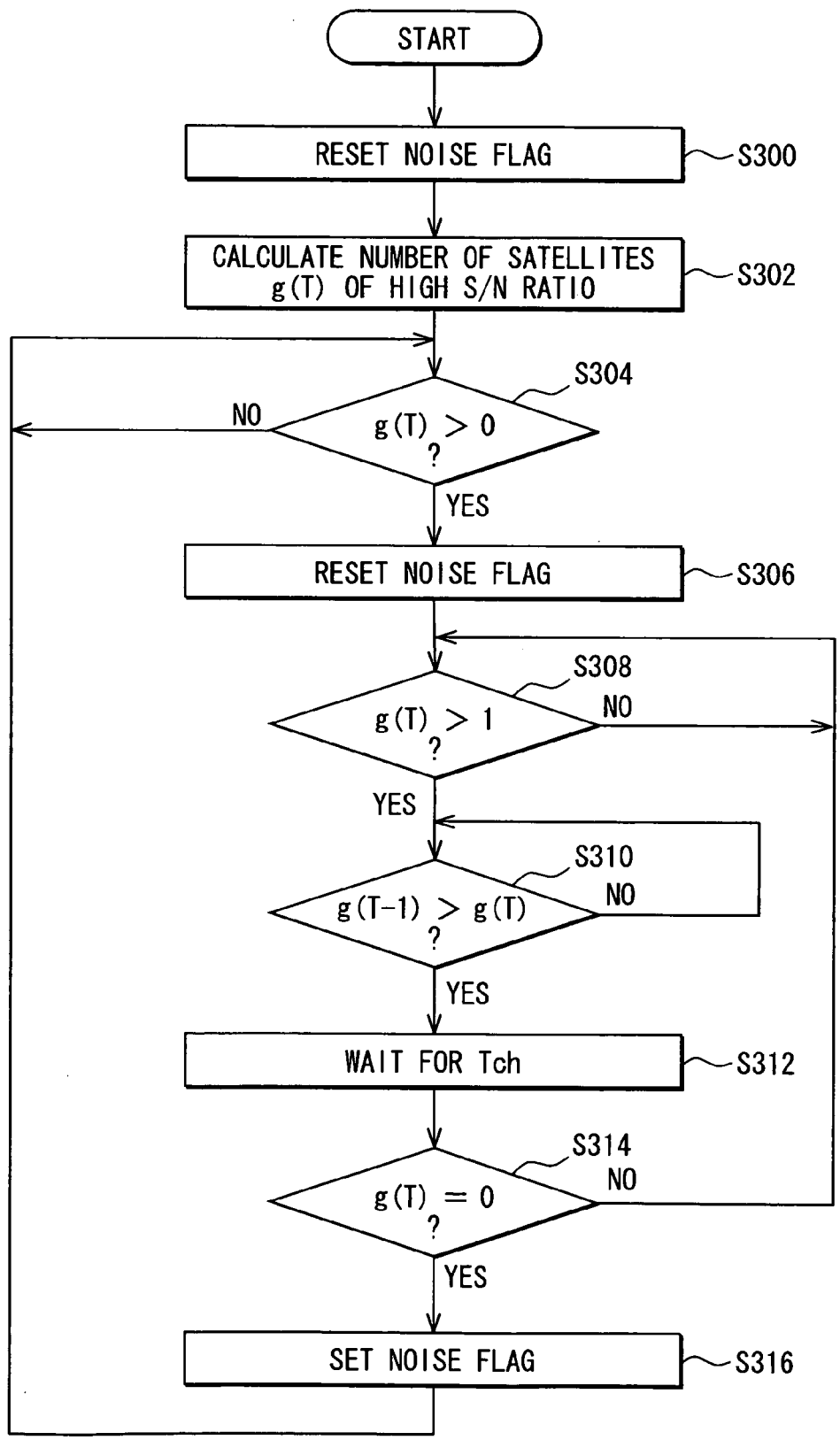
FIG. 5 is a flowchart showing a S/N ratio determination routine in a case of FIG. 4A and FIG. 4B.

For checking the S/N ratios of the GPS signals of the n-channels, the S/N ratio calculation circuit 28 is configured to perform a control program shown in FIG. 5. This control program is stored in the ROM, the flash memory or the like in the radio signal processing section 20. This routine is started when electric power supply to the radio receiver device 10 is turned on, and is performed for each GPS signal of the same frequency.

First at S300, the noise flag is reset as initialization by turning off the flag to 0. At S302, the number g(T) of GPS signals (satellites) of channels ch(k) among a total of n-channels, the S/N ratios of which are higher than the predetermined threshold level SNth at time T, are calculated. At S304, it is checked whether g(T) is more than 0, because the S/N ratio cannot be checked if g(T) is 0. If the g(T) becomes more than 0, the noise flag is reset (0) at S306.

Further it is checked at S308 whether g(T) is more than 1, because it is not possible to check the time of fall of the S/N ratio with only one g(T). When g(T) becomes to be more than 1, it is checked at S310 whether the number of the GPS satellites of which the S/N ratio of a channel ch(k) is more than the predetermined threshold level SNth has decreased with elapse of time from the previous calculation time T−1. That is, it is checked whether g(T−1) is greater than g(T).

When g(T) becomes to be less than g(T−1), wait is performed at S312. That is, no processing is performed for the predetermined period Tch, which is about several ms. It is further checked at S314 whether g(T) is 0 after the period Tch. This is for checking whether the S/N ratios of all channels ch(k) has fallen to be less than the threshold level SNth in the predetermined period Tch.

If g(T) becomes 0 in the predetermined period Tch, it is determined that the S/N ratio has been decreased by the digital noise of the digital processing section 30, and the noise flag is set (1) by turning on the noise flag. It is noted that g(T)=0 means that the S/N ratios of all GPS signals have fallen to be less than the predetermined threshold level SNth. The noise flag, which is set or reset as above, is output to the digital processing section 30. After S316, the processing returns to S304. If g(T) is not 0 at S314, the processing returns to S308. In this case, it is determined that the fall of the S/N ratio is not due to the digital noise.

As described above, the S/N ratio calculation circuit 28 checks whether the S/N ratios of the GPS signals of the same frequency received through the n-channels are lowered to be less than the predetermined threshold level SNth at substantially the same time. Therefore, the digital processing section 30 can switch over the operation mode of its digital processing properly to reduce the digital noise based on the S/N ratio of each channel.

(2) S/N Ratios of a Plurality of Frequencies of One GPS Signal

It is assumed here that the radio receiver device 10 receives a GPS signal of a plurality of different frequencies from one GPS satellite. In this case, when the S/N ratio falls due the digital noise, only the S/N ratios of the GPS signal of the same or its harmonics frequencies fall while the S/N ratios of the GPS signal of other frequencies do not fall.

Figure 6A:
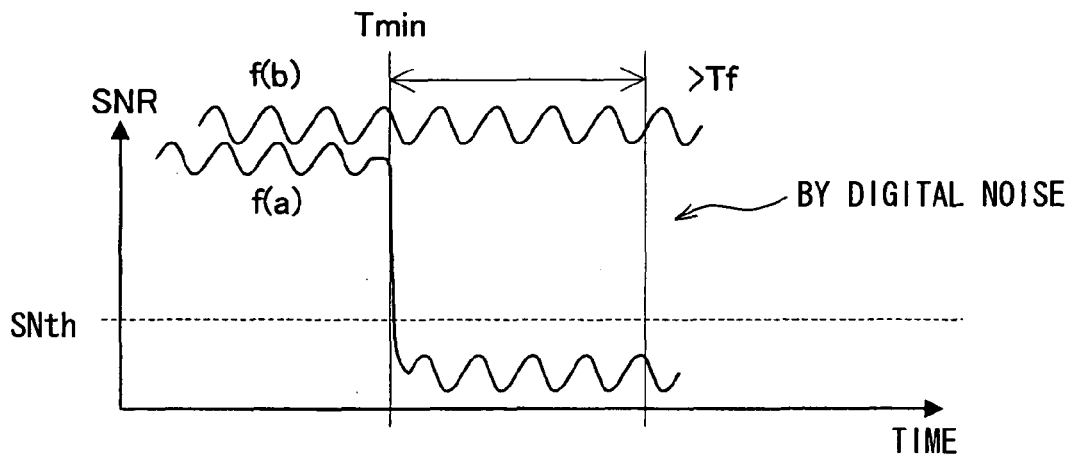
FIG. 6A and FIG. 6B are signal diagrams showing reception conditions of a plurality of frequencies of a radio signal received through one channel.

Specifically, as shown in FIG. 6A, it is determined that the fall of the S/N ratio is caused by the digital noise, if the S/N ratios of the GPS signal of different frequencies f(a) and f(b) do not fall within a predetermined period Tf. Here, "a" and "b" are different and varies from 1 to m. That is, if no second fall of the S/N ratio of the GPS signal of the frequency f(b) is detected after the time Tmin of first fall of the S/N ratio of the frequency f(a), it is determined that the fall is caused by the digital noise of the digital processing section 30. Here, Tf is set to several ms.

Figure 6B:
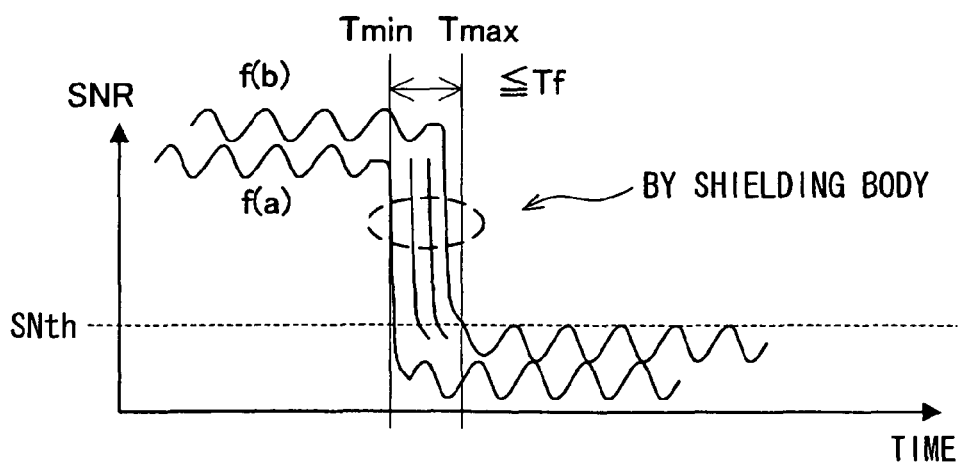

It is however determined that the fall of S/N ratio is caused by the shielding body such as a tunnel, if all the S/N ratios of the GPS signal falls within the predetermined period Tf with respect to different frequencies f(a), f(b), etc. as shown in FIG. 6B. That is, if all the fall of the S/N ratios of the GPS signal occurs with respect to different frequencies in the period from Tmin to Tmax, which is equal to or less than the predetermined period Tf, it is determined that the fall is caused by the shielding object.

Therefore, the S/N ratio calculation circuit 28 checks whether the S/N ratio is lowered due to the digital noise of the digital processing section 30 by checking the period of fall of the S/N ratios with respect to the plurality of frequencies of the GPS signal.

Figure 7:
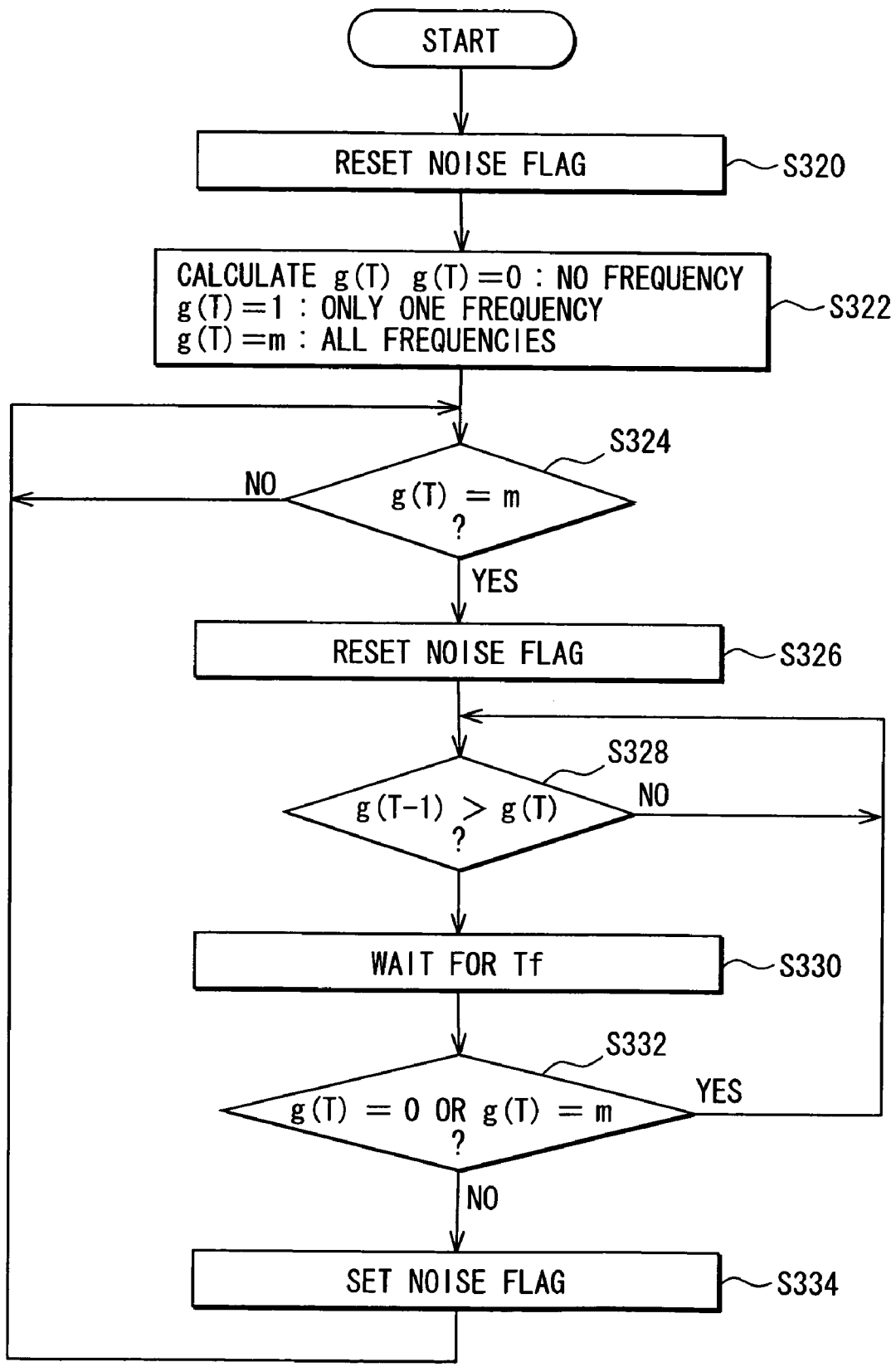
FIG. 7 is a flowchart showing a S/N ratio determination routine in a case of FIG. 6A and FIG. 6B.

The S/N ratio calculation circuit 28 is programmed to perform a control program as shown in FIG. 7. This control program is stored in the ROM or the flash memory of the radio signal processing section 20, and started when the electric power supply to the radio receiver device 10 is turned on.

First at S320, the noise flag is reset as initialization by turning off the flag to 0. At S322, the number g(T) of frequencies of the GPS signal, the S/N ratios of which are higher than the predetermined threshold level SNth at time T, among the plurality (m) of frequencies received from one GPS satellite is calculated.

Here, g(T) is 0, if none of the S/N ratios are higher than the predetermined threshold level SNth with respect to any frequencies. g(T) is 1, if the S/N ratio is higher than the predetermined threshold level SNth with respect to only one frequency. g(T) is m, if the S/N ratios are higher than the predetermined threshold SNth with respect to all the frequencies.

At S324, it is checked whether g(T) is m. If g(T) is m, the noise flag is reset to 0 by turning off the noise flag at S326.

At S328, it is checked whether the number g(T) of frequencies of high S/N ratios is decreased with elapse of time relative to the number g(T−1) calculated at the previous time T−1.

When the number g(T) is decreased because of the fall of the S/N ratio in a certain frequency, wait processing is performed for the predetermined period Tf at S330.

After the predetermined period Tf, it is checked at S332 whether g(T) is 0 indicating low S/N ratios at all frequencies, or m indicating no low S/N ratios at all frequencies. If g(T) is 0 or m, the processing returns to S328. If g(T) is 0, it is determined that the S/N ratio has fallen to be less than the predetermined threshold level SNth by the shielding body, and not by the digital noise.

If g(T) is not 0 nor m, it is determined that the S/N ratio has fallen to be less than the predetermined threshold level SNth by the digital noise. In this instance, at S334, the noise flag is set to 1 by turning on the noise flag and output to the digital processing section 30. The processing then returns to S324.

The digital processing section 30 switches over the operation mode in response to the noise flag (ON) in the similar manner as described above with reference to FIG. 5.

As described above, the S/N ratio calculation circuit 28 checks whether a part of the S/N ratios of the different frequencies of the same GPS signal received from one GPS satellite is lowered to be less than the predetermined threshold level SNth. Therefore, the digital processing section 30 can switch over the operation mode of the digital processing properly based on the S/N ratio of each frequency of the GPS signal received from the same GPS satellite.

As described above, the fall of the S/N ratio is caused by the digital noise of the digital processing section 30 or the shielding body. In some cases, under the surrounding condition in which the receiver sensitivity is not lowered because of no shielding bodies, etc., the S/N ratio is not lowered even if the digital noise is increased due to increase of frequency of the operating clock of the digital processing section 30.

Figure 8:
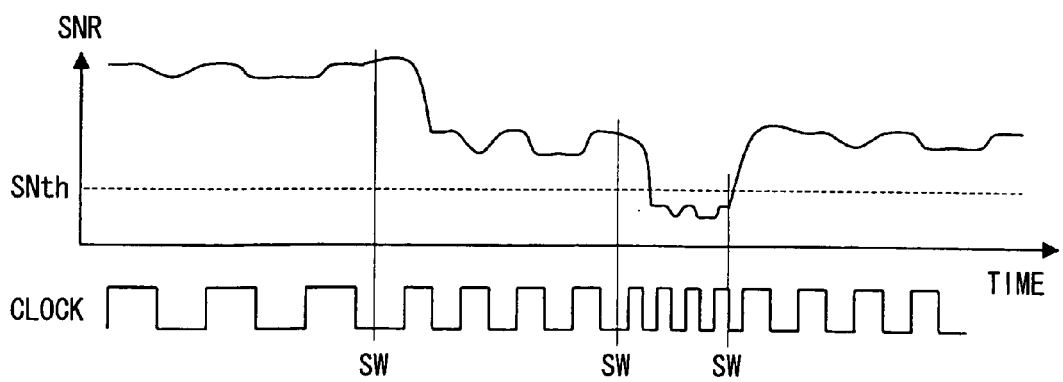
FIG. 8 is a timing diagram showing a relation between a S/N ratio and frequencies of an operating clock.

It may therefore be proposed to change the frequency of the operating clock in accordance with the S/N ratio of the GPS signal as shown in FIG. 8. Specifically, the frequency is increased to increase the amount or load of digital processing as long as the S/N ratio of the GPS signal does not fall to be less than the predetermined threshold level SNth, but the frequency is decreased to decrease the digital noise if the S/N ratio of the GPS signal falls to be less than the predetermined threshold level SNth. This frequency change or switching (SW) may be performed by frequency division or multiplication.

It may also be proposed to change the frequency of the operating clock in accordance with the number of GPS satellites, the S/N ratio of which are higher than the predetermined threshold level SNth. Specifically, the frequency is increased to increase the amount of load of digital processing as long as the number of GPS satellites of high S/N ratios is more than a predetermined threshold number, but the frequency is decreased to decrease the digital noise if the number of the GPS satellites of high S/N ratios is less than the predetermined threshold number.

Figure 9:
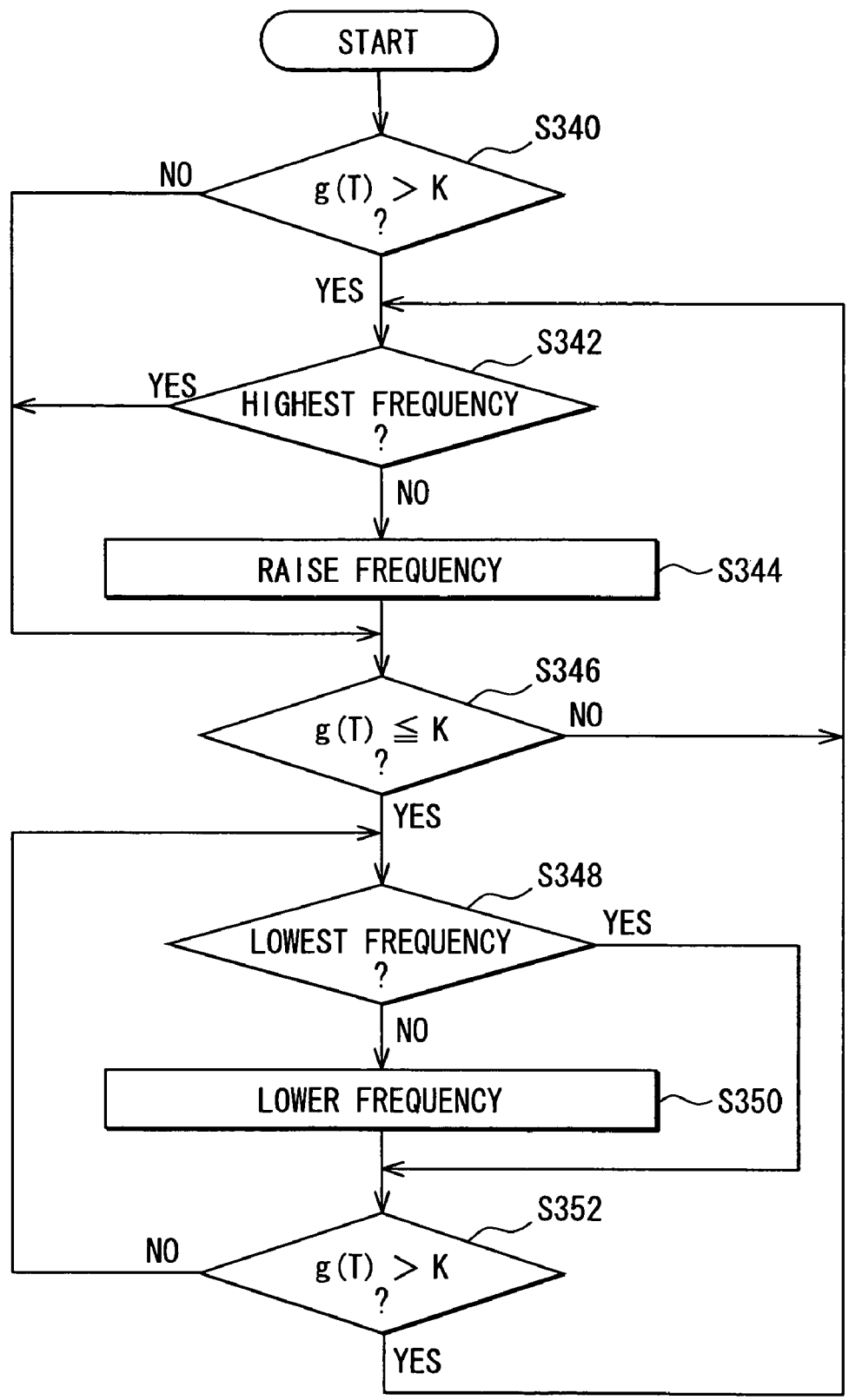
FIG. 9 is a flowchart showing a frequency processing routine.

The above-described dynamic change of the frequency of the operating clock in accordance with the change in the S/N ratio of the GPS signal is performed by a control program shown in FIG. 9. This program is stored in the ROM, flash memory or the like in the digital processing section 30. This routine for frequency processing is performed after the power supply is turned on.

In this routine, g(T) indicates the number of GPS satellites, the S/N ratios of the GPS signals of which are higher than the predetermined threshold level SNth at time T, and K indicates the predetermined threshold number of GPS satellites.

First at S340, it is checked whether g(T) is greater than K, thereby checking whether the receiver sensitivity is good. If g(T) is equal to or less than K because of poor receiver sensitivity, the processing jumps to S346.

If g(T) is greater than K because of good receiver sensitivity, it is checked at S342 whether the frequency of the operating clock is a predetermined highest frequency. If it is the highest frequency, the processing jumps to S346 because no more increase of the frequency is possible. If it is not the highest frequency, it is increased to one step higher frequency at 344.

At S346, it is checked whether g(T) is equal to or less than the predetermined threshold number. If g(T) is not equal to or less than K because of good receiver sensitivity, the processing returns to S342 to increase the frequency further if possible.

If g(T) is equal to or less than K because of poor receiver sensitivity, it is checked at S348 whether the frequency of the operating clock is a predetermined lowest frequency. If it is the lowest frequency, the processing jumps to S352 because no more decrease of the frequency is possible.

If the frequency is not the lowest frequency, it is decreased to one step lower frequency at S350.

Finally, it is checked at S352 whether g(T) is greater than K. If g(T) is greater than K because of good receiver sensitivity, the processing returns to S342 to increase the frequency further if possible. If g(T) is not greater than K, the processing returns to S348 to lower the frequency further if possible.

As described above, the CPU 32 dynamically changes the operation mode of the digital processing by changing the frequency of the operating clock based on changes in the S/N ratios of the GPS signal calculated by the S/N ratio calculation circuit 28, while the radio receiver device 10 is in operation. As a result, the amount or load of digital processing can be increased as much as possible in accordance with the S/N ratio change without causing fall of the S/N ratio.

The above-described exemplary embodiment may be modified in many ways. For example, in place of decreasing the frequency of the operating clock of the digital processing section 30, the digital processing operation of the digital processing may be stopped to reduce generation of digital noise. Further, the radio receiver device may be adapted to a cellular phone, which receives radio signals from a plurality of base stations, or a wireless local area network (LAN) terminal, which receives radio signals from a plurality of access points.

What is claimed is:

1. A radio receiver device comprising:
a radio signal processing means configured to convert a plurality of received radio signals into a corresponding plurality of converted digital signals and to demodulate the plurality of converted digital signals;
a signal-to-noise (S/N) ratio detecting means configured to detect a plurality of S/N ratios corresponding to the plurality of radio signals by analyzing the plurality of converted digital signals;
a S/N ratio checking means configured to check whether the plurality of S/N ratios are lower than a predetermined threshold level for the plurality of received radio signals;
a cause checking means configured to check whether the plurality of S/N ratios have been lowered by digital noise generated during digital processing when the S/N ratio of each of the plurality of radio signals received through a plurality of channels is lower than the predetermined threshold level with respect to a same frequency at a same time; and
a digital processing means configured to digitally process the plurality of converted digital signals and to switch over an operation mode of digital processing thereof based on the plurality of S/N ratios detected by the S/N ratio detecting means, thereby controlling the digital noise generated during the digital processing,
wherein the digital processing means switches over the operation mode by changing a frequency of an operating clock thereof.

2. The radio receiver device according to claim 1, wherein the digital processing means is configured to lower the frequency of the operating clock when the cause checking means determines that the S/N ratios have been lowered by the digital noise.

3. A radio receiver device comprising:
a radio signal processing means configured to convert a plurality of received radio signals into a corresponding plurality of converted digital signals and to demodulate the plurality of converted digital signals;
a signal-to-noise (S/N) ratio detecting means configured to detect a plurality of S/N ratios corresponding to the plurality of radio signals by analyzing the plurality of converted digital signals;
a S/N ratio checking means configured to check whether the plurality of S/N ratios are lower than a predetermined threshold level for the plurality of received radio signals;
a cause checking means configured to check whether the S/N ratios have been lowered by digital noise generated during digital processing when the S/N ratio of each of the plurality of radio signals received through a plurality of channels is lower than the predetermined threshold level with respect to a same frequency at a same time; and
a digital processing means configured to digitally process the plurality of converted digital signals and to switch over an operation mode of digital processing thereof based on the S/N ratios detected by the S/N ratio detecting means, thereby controlling the digital noise generated during the digital processing, wherein the digital processing means switches over the operation mode by stopping digital processing of a low priority to reduce a processing amount of the digital processing.

4. The radio receiver device of claim 1, wherein the cause checking means is configured to determine a time period over which the plurality of S/N ratios fall below the predetermined threshold level, the cause checking means is configured to determine whether the time period is less than a threshold duration, and the cause checking means is configured to determine that the plurality of S/N ratios have been lowered by digital noise generated during digital processing when the time period is determined to be less than the threshold duration.

5. The radio receiver device of claim 3, wherein the cause checking means is configured to determine a time period over which the plurality of S/N ratios fall below the predetermined threshold level, the cause checking means is configured to determine whether the time period is less than a threshold duration, and the cause checking means is configured to determine that the plurality of S/N ratios have been lowered by digital noise generated during digital processing when the time period is determined to be less than the threshold duration.

* * * * *